United States Patent
Zhu et al.

(10) Patent No.: US 8,388,159 B2
(45) Date of Patent: Mar. 5, 2013

(54) LIGHT GUIDE PLATES AND BACKLIGHT MODULE

(75) Inventors: Jun Zhu, Beijing (CN); Yan Zhao, Beijing (CN); He Zhang, Beijing (CN); Guo-Fan Jin, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 312 days.

(21) Appl. No.: 12/848,223

(22) Filed: Aug. 2, 2010

(65) Prior Publication Data
US 2011/0090672 A1 Apr. 21, 2011

(30) Foreign Application Priority Data
Oct. 16, 2009 (CN) .......................... 2009 1 0110522

(51) Int. Cl.
*G09F 13/04* (2006.01)

(52) U.S. Cl. ...................................... 362/97.1; 362/732
(58) Field of Classification Search ............... 362/97.1, 362/347, 732, 839; 359/732, 839
See application file for complete search history.

(56) References Cited

U.S. PATENT DOCUMENTS

| | | | | |
|---|---|---|---|---|
| 5,841,596 A | * | 11/1998 | Perlo et al. | ..................... 359/859 |
| 2010/0118225 A1 | * | 5/2010 | Lee | ................. 349/58 |

FOREIGN PATENT DOCUMENTS

CN 101206280 A 6/2008

* cited by examiner

*Primary Examiner* — Anne Hines
(74) *Attorney, Agent, or Firm* — Altis Law Group, Inc.

(57) ABSTRACT

A light guide plate includes a body having a bottom surface, a top surface opposite to the bottom surface, and at least one lateral side. A recess is defined at the top surface. The recess is concaved toward the bottom surface and has a reflective surface. Only one part of the reflective surface has reflective structure located thereon. A backlight module using the light guide plate is related.

20 Claims, 7 Drawing Sheets

LIGHT GUIDE PLATES AND BACKLIGHT MODULE

CROSS-REFERENCE TO RELATED APPLICATIONS

This application claims all benefits accruing under 35 U.S.C. §119 from China Patent Application No. 200910110522.6, filed on Oct. 16, 2009 in the China Intellectual Property Office, disclosure of which is incorporated herein by reference.

BACKGROUND

1. Technical Field

The present disclosure relates to light guide plates and backlight modules and, particularly, to a light guide plate for direct-type backlight module and a direct-type backlight module.

2. Description of Related Art

Currently, because liquid crystal displays (LCDs) are thin, lightweight, long lasting, and consume little power, they are extensively used in a variety of electronic devices. However, liquid crystal displays are not self-luminescent, therefore, backlight modules are typically required. Generally, backlight modules can be categorized as either direct-type backlight modules or edge-type backlight modules. Because direct-type backlight modules can provide high illumination in comparison with edge-type backlight modules, direct-type backlight modules are more widely employed in numerous applications.

Direct-type backlight modules, according to the prior art usually include a point light source such as light emitting diode (LED), a reflective plate, and a light guide plate. The light guide plate has a bottom surface and a top surface opposite to the bottom surface. The point light source is located adjacent to the bottom surface. The reflective plate is located on the side of the bottom surface. The light radiated from the point light source enters the light guide plate and hit the top surface with different incident angles. The first part of the lights leave the light guide plate through a refraction of the top surface, and the second part of the light enter the light guide plate through a reflection of the top surface. The second part of the light will leave the light guide plate after refraction between the top surface and the reflective plate. However, an illumination of the light guide plate is not uniform because the illumination of a center part of the top surface opposite to the point light source is more extreme.

What is needed, therefore, is to provide a light guide plate that has improved uniformity of illumination and a direct-type backlight module using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present light guide plate and direct-type backlight module.

Figure 1:
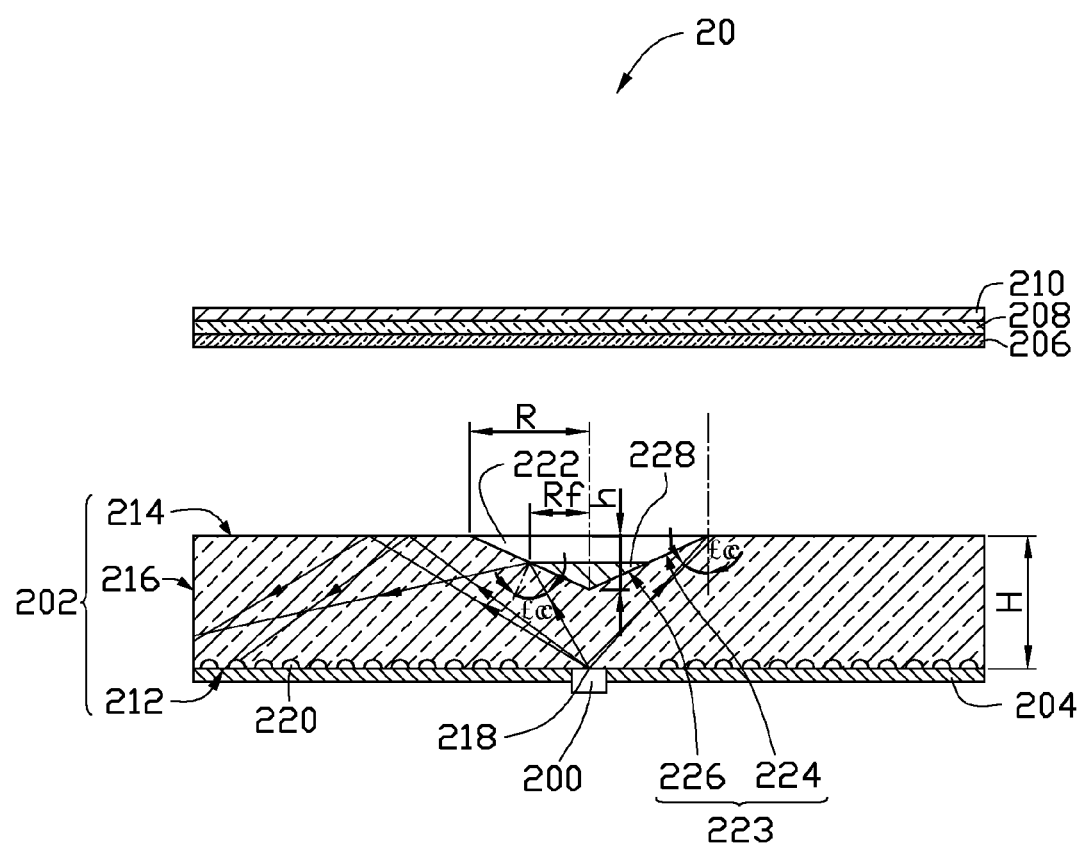
FIG. 1 is an exploded, cross-sectional view of one embodiment of a direct-type backlight module.

Referring to FIG. 1, a direct-type backlight module 20 of one embodiment includes a light source 200, a light guide plate 202, a reflective plate 204, a microprism plate 206, a polarization plate 208 and a diffusing plate 210. The light guide plate 202 has a bottom surface 212, a top surface 214 opposite to the bottom surface 212, and at least one lateral side 216. The light source 200 is located adjacent to the bottom surface 212 and aligned with a center 218 of the bottom surface 212. The reflective plate 204 is located adjacent to the bottom surface 212. The microprism plate 206, the polarization plate 208 and the diffusing plate 210 are located in sequence from bottom to top above the top surface 214 of the light guide plate 202.

The light guide plate 202 can be a transparent plate in a round, square, rectangle, polygon, or other shape. The light guide plate 202 can be made of plastic, polymethyl methacrylate (PMMA) or glass. The thickness of the guide plate 202 is arbitrary, and can be selected according to need. In one embodiment, the light guide plate 202 is a square PMMA plate with a side length of 50 millimeters.

The bottom surface 212 can have a plurality of scattering dots 220 located around the center 218. The scattering dots 220 can be protruding, concave or a combination thereof. The shape of the scattering dots 220 can be spherical, hemispherical, conical or a combination thereof. Effective diameters of the scattering dots 220 range from about 0.1 millimeters to about 0.5 millimeters. The scattering dots 220 can be made of ink, Ti-related materials, or Si compound. The exposed surfaces of the scattering dots 220 can be coated with highly reflective material (not shown). The scattering dots 220 are configured to scatter incident lights propagating within the light guide plate 202, and thereby uniformly transmit the light to the top surface 214 of the light guide plate 202. The lights reflected by the top surface 214 can be scattered by the scattering dots 220. Then the lights scattered by the scattering dots 220 get to the top surface 214 to illuminate the area of the top surface 214. Thus, the uniformity of light output can be further improved.

A recess 222 is defined in the light guide plate 202 at the top surface 214. The recess 222 is concave toward the center 218.

The recess 222 has a reflective surface 223 such as a curved surface like hemispherical surface, a hyperboloid, or a conic surface, or faces deformed like a pyramidal surface. The reflective surface 223 is configured to reflect part of the lights from the corresponding light source 200 to the inside of the light guide plate 202. The lights reflected into the light guide plate 202 by the reflective surface 223 can be scattered by the scattering dots 220 and get to the top surface 214 uniformly. Thus, the uniformity of illumination of the backlight module 20 is improved. The shape of the reflective surface 223 is not limited to what is described and is illustrated above. Any suitable shapes that allow the reflective surface 223 to redirect light into the light guide plate 202 may be employed.

The reflective surface 223 includes a first area 224 and a second area 226. A light incident angle in the first area 224 is greater than a total reflection critical angle of the light guide plate 202, and the light incident angle in the second area 226 is smaller than the total reflection critical angle of the light guide plate 202. A reflective structure 228 is located on the second area 226. The reflective structure 228 can be a reflective film, a plurality of microstructures formed by erosion, or reflective material filled in the recess 222 as shown in FIG. 1. In one embodiment, the recess 222 is formed by removing a revolving body defined by boring about a center axis of the light guide plate 202. one embodiment, the shape of the recess 222 is a cone with a round bottom surface (not labeled) and a peak (not labeled). A center line goes through the peak and a center of the round bottom surface. A semidiameter R of the round bottom surface satisfies the following formula: R=H*tan $\theta_c$, where, 'H' is the thickness of the light guide plate 202; and '$\theta_c$' is the total reflection critical angle of the light guide plate 202. For example, if the light guide plate 202 is made of PMMA, the $\theta_c$ of the light guide plate 202 is 42 degrees. When the thickness H of the light guide plate 202 is 5 millimeters, and the semidiameter R of the round bottom surface is 4.5 millimeters. A light incident angle in an area of the top surface 214 beside the reflective surface 223 is greater than the total reflection critical angle of the light guide plate 202 because the semidiameter R of the round bottom surface satisfies the following formula: R=H*tan $\theta_c$.

In one embodiment, the reflective surface 223 is a conic surface with a center line overlapping the center axis of the light guide plate 202. A critical reflection ring (not labeled) is defined where the first area 224 adjoins the second area 226. A semidiameter $R_f$ of the critical reflection ring satisfies the following formula:

$$R_f = (h - H) * \frac{\sin\alpha}{\cos\theta_c} * \cos(\alpha + \theta_c)$$

where, 'h' is a depth of the conical recess 222, and 0<h<H; '$\alpha$' is a cone angle of the conical recess 222, and $$\alpha = \tan^{-1}\left(\frac{R}{h}\right).$$

When h=2 millimeters, $R_f$=1.247 millimeters.

Furthermore, a plurality of scattering dots (not shown) can be located on the area of the top surface 214 beside the reflective surface 223.

The light sources 200 can be fastened on some portion of an associated LCD device, e.g. a housing of LCD device. The light source 200 is a point light source such as a fluorescent lamp or light-emitting diode (LED). In one embodiment, the light source 200 is a monochromatic LED.

The shape and the area of the reflective plate 204 are the same as that of the light guide plate 202. The thickness of the reflective plate 204 is arbitrary, and can be selected according to need. Part of the reflective plate 204 opposite to the light source 200 is transparent or hollow so that the light eradiated from the light source 200 can enter the light guide plate 202 directly. In one embodiment, part of the reflective plate 204 opposite to the light source 200 is hollow. The light source 200 is located in the hollow. The reflective plate 204 further includes a reflective film (not shown) located on the surface of the reflective plate 204 opposite to the light guide plate 202. The light striking on the bottom surface 212 of the light guide plate 202 can be reflected back into the light guide plate 202. Thus, the uniformity of illumination of the backlight module 20 can be improved.

The microprism plate 206, the polarization plate 208 and the diffusing plate 210 are located in sequence from bottom to top above the top surface 214 of the light guide plate 202. The microprism plate 206 is configured to better focus light along desired paths. The polarization plate 208 is located between the microprism plate 206 and the diffusing plate 210. The polarization plate 208 is configured to polarize and modulate the light passing there through. The diffusing plate 210 is configured to enhance the uniformity of distribution of light that passes from the backlight module 20 to the display panel.

For enhancing reflection efficiency, the bottom surface 212 and lateral side 216 of the scattering dot 220 can be coated with highly reflective material (not shown). In addition, the backlight module 20 can further include an optical film (not shown), such as a brightness enhancement film (BEF) or a light scattering film, located above the top surface 214. The optical film increases the brightness of a display panel (not shown) of the LCD device.

In the working process of the backlight module 20, the light radiated from the light source 200 enters the light guide plate 202 and arrives at the top surface 214. Part of the light having an incident angle greater than the total reflection critical angle are reflected by the first area 224, of the reflective surface 223, and the area, of the top surface 214 beside the reflective surface 223 into the light guide plate 202. The other part of the light having an incident angle smaller than the total reflection critical angle is reflected by the reflective structure 228, on the second area 226 of the reflective surface 223, into the light guide plate 202. The lights in the light guide plate 202 are reflected between the top surface 214 and the reflective plate 204 until it leaves the light guide plate 202. At the same time, the lights in the light guide plate 202 are scattered by the scattering dots 220 to various directions. The illumination of an area of the top surface 214 opposite to the light source 200 will decrease and the illumination of an area of the top surface 214 beside the reflective surface 223 will increase. Thus, the uniformity of illumination of the backlight module 20 can improve. The backlight module 20 can be widely employed in Liquid Crystal Displays. The light guide plate 202 provided in the disclosure can be used in a backlight module having different structure with the backlight module 20.

Figure 2:
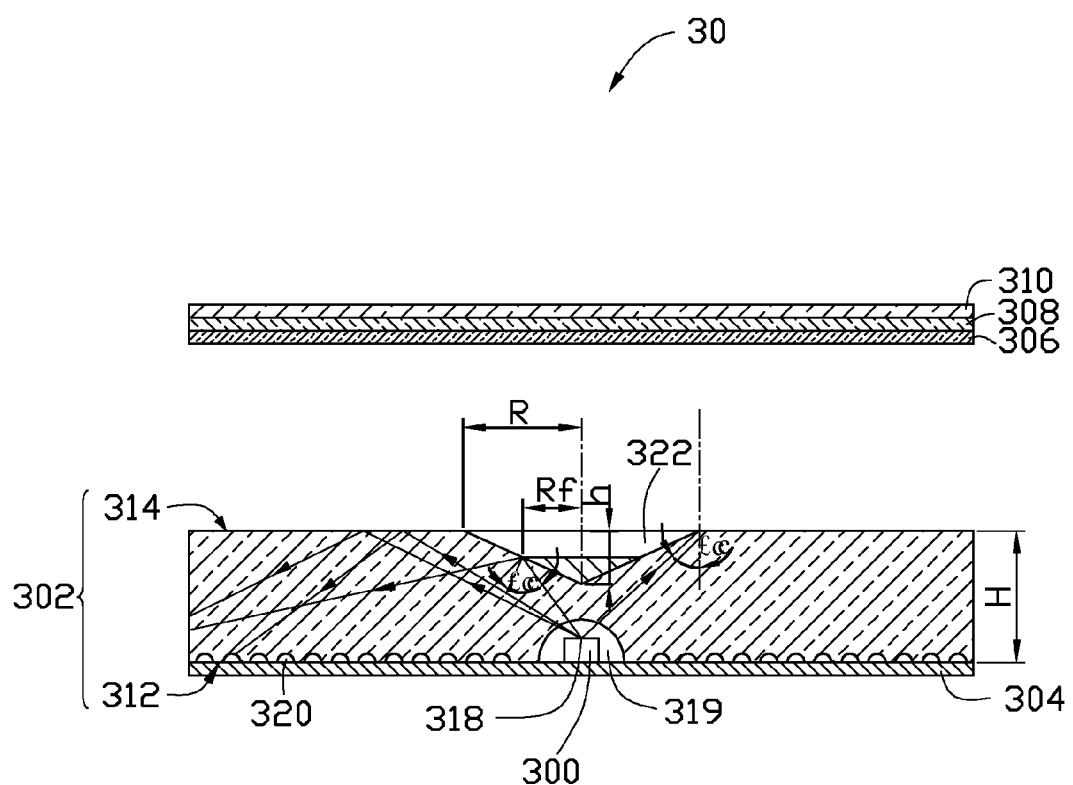
FIG. 2 is an exploded, cross-sectional view of another embodiment of a direct-type backlight module.

Referring to FIG. 2, a direct-type backlight module 30 of another embodiment includes a light source 300, a light guide plate 302, a reflective plate 304, a microprism plate 306, a polarization plate 308 and a diffusing plate 310. The light guide plate 302 includes a body having a bottom surface 312, and a top surface 314 opposite to the bottom surface 312. The bottom surface 312 has a center 318 and a plurality of scattering dots 320 located around the center 318. The light source 300 is located adjacent to the bottom surface 312 and aligned with the center 318 of the bottom surface 312. The reflective plate 304 is located adjacent to the bottom surface 312. The microprism plate 306, the polarization plate 308 and the diffusing plate 310 are located in sequence from bottom to top above the top surface 314 of the light guide plate 302. The light guide plate 302 on the top surface 314 defines a recess 322. The recess 322 is concave toward the light guide plate 302 and opposite to the center 318.

The structure of the direct-type backlight module 30 of the present embodiment is similar with the direct-type backlight module 20 of described in above embodiment, except that the light guide plate 302 on the bottom surface 312 for accommodating the light source 300 defines an accommodation 319. The accommodation 319 is a concave cavity turned towards the light guide plate 302 at the center 318. An inner surface of the accommodation 319 can be a curved surface like hemispherical surface, a hyperboloid, or a conic surface, or have surfaces deformed like a pyramidal surface. The shape of the accommodation 319 can be same as or different from the shape of the recess 322. In one embodiment, the light source 300 is located on the reflective plate 304 and accepted by the accommodation 319. In one embodiment, the light source 200 can be disposed partly within the corresponding accommodation 319 and partly outside the corresponding accommodation 319. A depth or height $h_0$ of the accommodation 319 satisfies the condition of $0<h_0<(H-h)$, where, 'h' is a depth of the recess 322. The recess 222 can be formed by removing a revolving body around a center axis of the light guide plate 302.

In one embodiment, the recess 322 is formed by removing a revolving body defined by revolving a triangle around the center axis of the light guide plate 302, and the accommodation 319 is formed by removing a hemisphere around the center axis of the light guide plate 302 as shown in FIG. 2.

Figure 3:
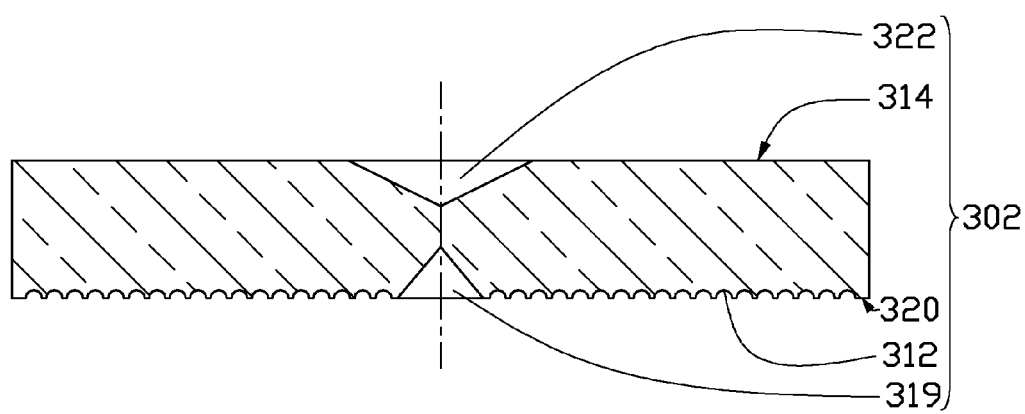
FIG. 3 is an exploded, cross-sectional view of one embodiment of a light guide plate of the direct-type backlight module FIG. 2.

In one embodiment, both the recess 322 and the accommodation 319 are formed by removing a revolving body defined by revolving a triangle around the center axis of the light guide plate 302 as shown in FIG. 3.

Figure 4:
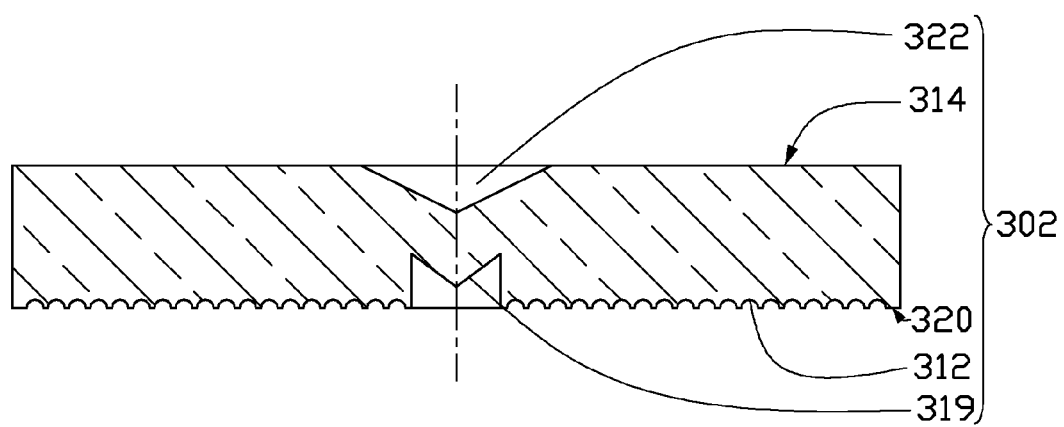
FIG. 4 is an exploded, cross-sectional view of one embodiment of a light guide plates of the direct-type backlight module FIG. 2.

In one embodiment, the recess 322 is formed by removing a revolving body defined by revolving a triangle around the center axis of the light guide plate 302, and the accommodation 319 is formed by removing a revolving body defined by revolving a trapezium around the center axis of the light guide plate 302 as shown in FIG. 4.

Figure 5:
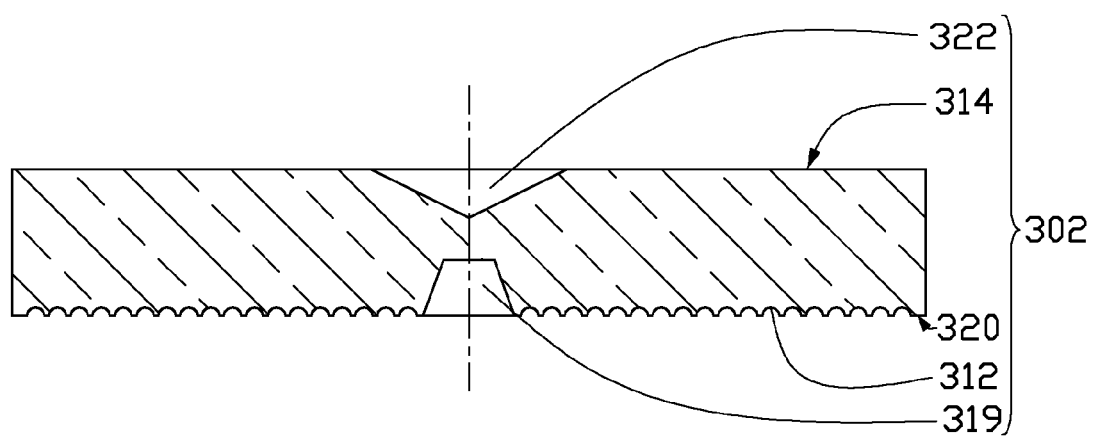
FIG. 5 is an exploded, cross-sectional view of one embodiment of a light guide plates of the direct-type backlight module FIG. 2.

In one embodiment, the recess 322 is formed by removing a revolving body defined by revolving a triangle around the center axis of the light guide plate 302, and the accommodation 319 is formed by removing a revolving body defined by revolving a trapezium around the center axis of the light guide plate 302 as shown in FIG. 5.

Figure 6:
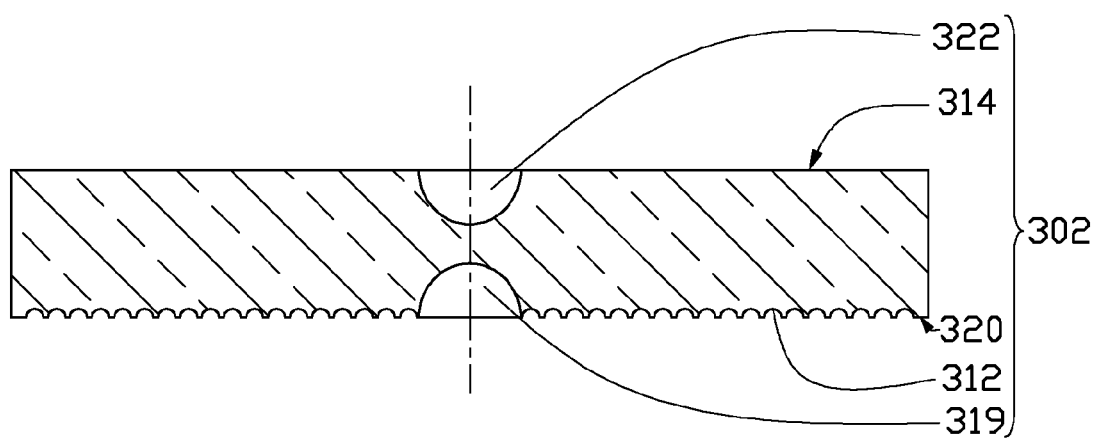
FIG. 6 is an exploded, cross-sectional view of one embodiment of a light guide plates of the direct-type backlight module FIG. 2.

In one embodiment, both the recess 322 and the accommodation 319 are formed by removing a hemisphere around the center axis of the light guide plate 302 as shown in FIG. 6.

Figure 7:
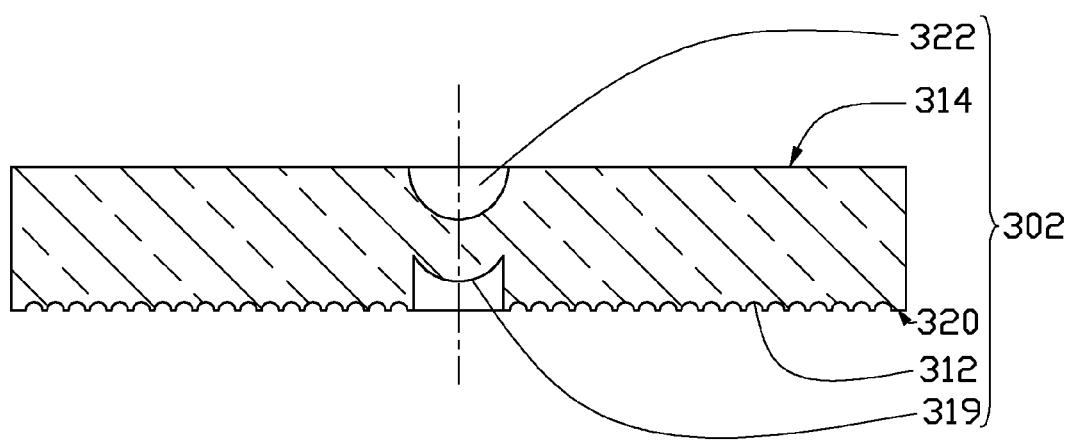
FIG. 7 is an exploded, cross-sectional view of one embodiment of a light guide plates of the direct-type backlight module FIG. 2.

In one embodiment, the recess 322 is formed by removing a hemisphere around the center axis of the light guide plate 302, and the accommodation 319 is formed by removing a revolving body defined by revolving a trapezium around the center axis of the light guide plate 302 as shown in FIG. 7.

When the direct-type backlight module 30 includes a plurality of light sources 300, a plurality of recesses 322 and accommodations 319 can be formed corresponding to each of the light sources 300.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A light guide plate, comprising:
a bottom surface, a top surface opposite to the bottom surface, and at least one lateral side; and a recess defined at the top surface, the recess is concaved toward the bottom surface and has a reflective surface, and only one part of the reflective surface has reflective structure located thereon,
wherein the reflective surface comprises a first area and a second area, and the reflective structure is located on the second area; a first light incident angle in the first area is greater than a total reflection critical angle of the light guide plate, and a second light incident angle in the second area is smaller than the total reflection critical angle of the light guide plate; the recess is a cone, and a semidiameter 'R' of the cone satisfies the following formula: $R=H*\tan\theta_c$, where, 'H' is a thickness of the light guide plate, and '$\theta_c$' is a total reflection critical angle of the light guide plate.

2. The light guide plate of claim 1, wherein the recess is formed by removing a revolving body.

3. The light guide plate of claim 1, wherein a critical reflection ring is defined at where the first area adjoins the second area; a semidiameter '$R_f$' of the critical reflection ring satisfies the following formula:

$$R_f = (h-H) * \frac{\sin\alpha}{\cos\theta_c} * \cos(\alpha + \theta_c)$$

where, 'h' is a depth of the cone, and $0<h<H$; '$\alpha$' is a cone angle of the conical recess, and $$\alpha = \tan^{-1}\left(\frac{R}{h}\right).$$

4. The light guide plate of claim 1, wherein the reflective structure is selected from the group consisting of reflective film, microstructures, and reflective material.

5. The light guide plate of claim 1, wherein the bottom surface has a plurality of scattering dots located thereon.

6. The light guide plate of claim 1, wherein an accommodation is defined on the bottom surface and configured for accommodating a light source.

7. The light guide plate of claim 6, wherein the accommodation is a cavity concaved toward the top surface, and an inner surface of the accommodation is a hemispherical surface, a hyperboloid, a conic surface, or a pyramidal surface.

8. A backlight module comprising:
a light guide plate comprising a bottom surface, a top surface opposite to the bottom surface, and at least one lateral side;
a recess is defined at the top surface, the recess is concaved toward the bottom surface and has a reflective surface, and only one part of the reflective surface has reflective structure located thereon, wherein the reflective surface comprises a first area and a second area, and the reflective structure is located on the second area a light incident angle in the first area is greater than a total reflection critical angle of the light guide plate, and the light incident angle in the second area is smaller than the total reflection critical angle of the light guide plate; the recess is a cone, and a semidiameter 'R' of the cone satisfies the following formula: R=H*tanθ$_c$, where, 'H' is a thickness of the light guide plate, and 'θc' is a total reflection critical angle of the light guide plate; and a light source, the light source being located adjacent to the bottom surface and opposite to the recess.

9. The backlight module of claim 8, wherein a critical reflection ring is defined at where the first area adjoins the second area; a semidiameter R$_f$ of the critical reflection ring satisfies the following formula:

$$R_f = (h - H) * \frac{\sin\alpha}{\cos\theta_c} * \cos(\alpha + \theta_c)$$

where, 'h' is a depth of the cone, and 0<h<H; 'α' is a cone angle of the conical recess, and $$\alpha = \tan^{-1}\left(\frac{R}{h}\right).$$

10. The backlight module of claim 8, further comprising a reflective plate located adjacent to the bottom surface.

11. The backlight module of claim 8, further comprising a microprism plate, a polarization plate, and a diffusing plate.

12. A light guide plate, comprising:
a bottom surface, a top surface opposite to the bottom surface, and at least one lateral side;
and a recess defined at the top surface, wherein the recess is concaved toward the bottom surface and has an inner surface as a reflective surface, the inner surface comprises a first area and a second area, and a reflective structure is located only on the second area.

13. The light guide plate of claim 12, wherein the second area the is near a center of the inner surface of the recess, the first area is near a edge of the inner surface of the recess, and the first area surrounds the second area.

14. The light guide plate of claim 12, wherein a first light incident angle in the first area is greater than a total reflection critical angle of the light guide plate, and a second light incident angle in the second area is smaller than the total reflection critical angle of the light guide plate.

15. The light guide plate of claim 12, wherein the reflective surface is selected from the group consisting of a hemispherical surface, a hyperboloid, a conic surface, and a pyramidal surface.

16. The light guide plate of claim 12, wherein the recess is formed by removing a revolving body.

17. The light guide plate of claim 12, wherein the reflective structure is selected from the group consisting of reflective film, microstructures, and reflective material.

18. The light guide plate of claim 12, wherein the bottom surface has a plurality of scattering dots located thereon.

19. The light guide plate of claim 12, wherein an accommodation is defined on the bottom surface and configured for accommodating a light source.

20. The light guide plate of claim 19, wherein the accommodation is a cavity concaved toward the top surface, and an inner surface of the accommodation is a hemispherical surface, a hyperboloid, a conic surface, or a pyramidal surface.

* * * * *